(12) United States Patent
Gogoi et al.

(10) Patent No.: US 7,827,660 B2
(45) Date of Patent: Nov. 9, 2010

(54) BIMORPHIC STRUCTURES, SENSOR STRUCTURES FORMED THEREWITH, AND METHODS THEREFOR

(75) Inventors: Bishnu Prasanna Gogoi, Scottsdale, AZ (US); Navid Yazdi, Ann Arbor, MI (US)

(73) Assignee: Evigia Systems, Inc., Ann Arbor, MI (US)

( * ) Notice: Subject to any disclaimer, the term of this patent is extended or adjusted under 35 U.S.C. 154(b) by 0 days.

(21) Appl. No.: 12/182,713

(22) Filed: Jul. 30, 2008

(65) Prior Publication Data
US 2009/0056108 A1 Mar. 5, 2009

Related U.S. Application Data

(62) Division of application No. 11/848,336, filed on Aug. 31, 2007, now Pat. No. 7,495,368.

(51) Int. Cl.
*H01L 41/22* (2006.01)
*H04R 17/00* (2006.01)

(52) U.S. Cl. .................. 29/25.35; 29/592.1; 29/593; 29/594; 29/595; 310/300; 310/307; 73/776; 73/774; 73/781; 257/414

(58) Field of Classification Search ............ 29/592.1, 29/593–595, 25.35; 310/300, 307; 73/766–770, 73/774, 781; 257/414
See application file for complete search history.

(56) References Cited

U.S. PATENT DOCUMENTS

| | | | | |
|---|---|---|---|---|
| 4,912,822 A | * | 4/1990 | Zdeblick et al. | 29/25.35 |
| 5,982,009 A | * | 11/1999 | Hong et al. | 257/414 |
| 6,876,482 B2 | * | 4/2005 | DeReus | 359/290 |
| 2003/0132823 A1 | * | 7/2003 | Hyman et al. | 335/78 |
| 2004/0188785 A1 | * | 9/2004 | Cunningham et al. | 257/415 |
| 2006/0018239 A1 | * | 1/2006 | Nam et al. | 369/126 |

* cited by examiner

*Primary Examiner*—Derris H Banks
*Assistant Examiner*—Jeffrey Carley
(74) *Attorney, Agent, or Firm*—Hartman & Hartman, P.C.; Gary M. Hartman; Domenica N. S. Hartman

(57) ABSTRACT

A bimorphic structure responsive to changes in an environmental condition, sensor structures incorporating one or more of such bimorphic structures, and a method of forming such bimorphic structures. The sensor structure has an electrically-conductive first contact on a substrate, and a bimorph beam anchored to the substrate so that a portion thereof is suspended above the first contact. The bimorph beam has a multilayer structure that includes first and second layers, with the second layer between the first layer and the substrate. A portion of the first layer projects through an opening in the second layer toward the first contact so as to define an electrically-conductive second contact located on the beam so as to be spaced apart and aligned with the first contact for contact with the first contact when the beam sufficiently deflects toward the substrate.

19 Claims, 3 Drawing Sheets

BIMORPHIC STRUCTURES, SENSOR STRUCTURES FORMED THEREWITH, AND METHODS THEREFOR

CROSS REFERENCE TO RELATED APPLICATIONS

This is a division patent application of co-pending U.S. patent application Ser. No. 11/848,336, filed Aug. 31, 2007.

BACKGROUND OF THE INVENTION

The present invention generally relates to structures responsive to changes in environmental conditions, such as heat, humidity, etc., and processes for producing such structures. More particularly, this invention relates to bimorphic structures and methods of forming a bimorphic structure having a well-defined contact area and gap relative to a fixed contact with which the contact area makes contact in response to changes in an environmental condition being monitored.

Bimetallic beams and other bimorphic structures exhibit a bimorphic effect that renders such structures capable of monitoring temperature or another environmental condition. As understood in the art, the term "bimorphic effect" is used to denote the bending of a composite structure resulting in changes in the environment of the composite structure, such as changes in temperature that cause the composite structure to deflect as a result of differences in the coefficients of thermal expansion (CTE) of the materials used to form the structure.

Bimorphic beam structures have been adapted for use in a variety of systems and produced by various processes, a non-limiting example of which is commonly-assigned U.S. patent application Ser. No. 11/383,200 to Yazdi, the contents of which are incorporated herein by reference. Yazdi discloses a sensor that makes use of a large number of bimorphic structures. The bimorphic structures are MEMS (micro-electromechanical systems) that operate as switches for the purpose of measuring cumulative heat, humidity, etc., to enable continuous monitoring of storage and shipping conditions for various items. Yazdi's sensor finds use in a variety of applications, including supply-chain management of perishable goods, pharmaceuticals, chemicals, and fresh agriculture products.

Bimorph beams have been fabricated using micromachining technology and are typically formed in the following manner. A conducting contact pad is first formed in a substrate (such as silicon) that has an insulating layer. A sacrificial layer is deposited on the substrate and over the contact pad, and is then patterned and etched to define a first opening to the contact pad and a second opening in which an anchor for the beam will be subsequently formed. The materials of the bimorphic (e.g., bimetallic) structure are deposited on the sacrificial layer using thin film processes, after which the beams are defined by using photolithography and etching techniques. The sacrificial layer is then removed using an etchant that is selective to the materials used to form the beam. If the bimorphic structure is responsive to temperature, individual beams can be fabricated to deflect so that, at a certain temperature and beam length, the beam will contact the contact pad on the substrate. This contact can be detected and used to measure or otherwise monitor temperature. The contact of the beam with the contact pad can vary because line or point contact may occur, which can introduce unreliabilities when used to detect the closure of the contact. Consequently, it would be desirable if the contact area of a bimorph beam with a fixed pad could be rendered more well defined, repeatable and reliable.

BRIEF SUMMARY OF THE INVENTION

The present invention provides a bimorphic structure, sensor structures incorporating one or more bimorphic structures, and a method of forming one or more bimorphic structures, each having a well-defined contact area and gap relative to a fixed contact with which the contact area makes contact in response to changes in an environmental condition to which the structure is responsive.

According to a first aspect of the invention, a sensor structure has an electrically-conductive first contact on a substrate, and a bimorph beam anchored to the substrate so that a portion thereof is suspended above the first contact. The bimorph beam has a multilayer structure that includes first and second layers, with the second layer between the first layer and the substrate. The first layer is formed of an electrically conductive material and a portion thereof projects through an opening in the second layer toward the first contact so as to define a second contact located on the beam so as to be spaced apart and aligned with the first contact for contact with the first contact when the beam sufficiently deflects toward the substrate.

According to a second aspect of the invention, a method of forming a sensor structure entails depositing an electrically conductive material on a substrate and forming therefrom a first contact, and then forming a bimorph beam anchored to the substrate so that a portion of the beam is suspended above the first contact. The bimorph beam is formed to have a multilayer structure including first and second layers, with the second layer between the first layer and the substrate and the first layer having a portion projecting through an opening in the second layer toward the first contact. The first layer is formed of an electrically conductive material such that the portion of the first layer projecting through the opening defines a second contact located on the bimorph beam so as to be spaced apart and aligned with the first contact for contact with the first contact when the bimorph beam sufficiently deflects toward the substrate.

According to a preferred aspect of the invention, the beam is formed using micromachining technology, such that the sensor structure and its beam may be termed a MEMS (micro-electro-mechanical system) device. The gap spacing the second contact from the first contact is determined by the thickness of a sacrificial layer that is removed after the first and second layers of the bimorph beam are formed. The size and shape of the opening in the second layer that defines the second contact can be selected and controlled to ensure that contact between the first and second contacts is well-defined in terms of contact area, resulting in a more reliable and repeatable contact. The gap spacing the second contact from the first contact can be further accurately controlled by etching the sacrificial layer through the opening to form a recess in the sacrificial layer, with the remaining thickness of the sacrificial layer determining the gap and, therefore, the distance the beam must deflect, thereby further promoting reliable and repeatable contact between the first and second contacts. Because electrical contact to the first contact is with the second contact formed by the first layer of the bimorphic beam, the second layer can be formed of a nonconductive material, contrary to conventional bimorph beams in which the layer closest to the fixed contact is electrically conductive.

The bimorph beam can be used for the monitoring a various environmental conditions, such as temperature by forming the first and second layers of materials with different coefficients of thermal expansion. By fabricating an array of the bimorph beams on a substrate, a sensor structure can be formed to have beams of different lengths so that the beams make contact with their respective fixed contact pads over a range of changes in the environmental condition being sensed. The bimorph beams can be fabricated using low temperature processes compatible with integrate circuit (IC) processes, such as CMOS processes, to yield an integrated sensor array.

Other objects and advantages of this invention will be better appreciated from the following detailed description.

DETAILED DESCRIPTION OF THE INVENTION

The Figures represent a bimorph beam 10 and a process by which the beam 10 can be fabricated. According to a preferred aspect of the invention, the bimorph beam 10 is formed so as to provide a well-defined contact area between a moving contact 12 carried by the beam and a fixed contact pad 14 beneath the moving contact 12. As well understood in the art, if intended to sense temperature the beam 10 is fabricated to have a composite structure of materials having different coefficients of thermal expansion (CTE) so that the beam 10 deflects in response to temperature changes and makes contact with its fixed contact pad 14 if a sufficiently large temperature change occurs. Similarly, if intended to sense humidity the beam 10 is fabricated to have a composite structure of materials having different humidity-induced expansion characteristics so that the beam 10 deflects in response to humidity changes and makes contact with its fixed contact pad 14 if a sufficiently large humidity change occurs. The beam 10 can be fabricated to be responsive to other environmental conditions by appropriately selecting its materials. The beam 10 can be one of any number of beams in any suitable type of array on a substrate. The bimorph beams of such an array can be formed to have different lengths so that the beams make contact with their respective fixed contact pads over a range of temperature changes. It should be noted that the Figures are drawn for purposes of clarity when viewed in combination with the following description, and therefore are not necessarily to scale.

Figure 1:
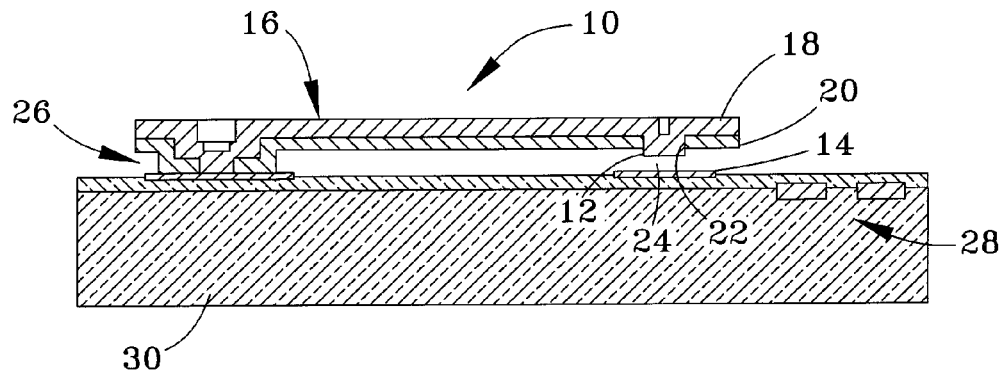
FIG. 1 is a side view of a substrate on which a bimorph beam has been fabricated in accordance with a preferred embodiment of this invention.
Figure 2:
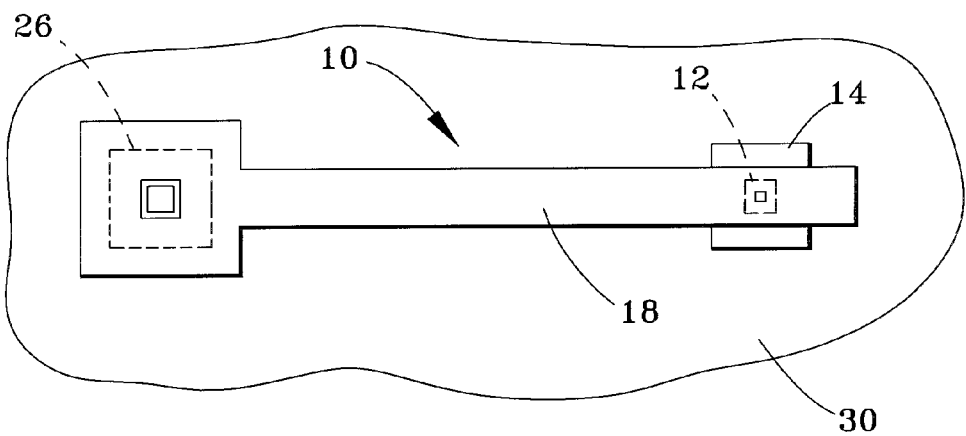
FIG. 2 is a plan view of the bimorph beam of FIG. 1.

In FIGS. 1 and 2, the bimorph beam 10 can be seen as having a layered (composite) structure 16 with two layers 18 and 20, though it should be understood that additional layers could be present in the beam 10. Various different materials and material combinations can be used to form the layered structure 16. If intended to sense temperature, metals such as aluminum and gold are suitable for the layers 18 and 20, though it is foreseeable that other material combinations could be used, including metals and nonmetals. If intended to sense humidity, one of the layers 18 or 20 is preferably formed of a material that does not exhibit any appreciable humidity-induced expansion, such as aluminum or gold, while the other layer 20 or 18 is preferably formed of a material that exhibits a notable response to humidity. Certain polymer materials are well suited for this purpose, a particular example of which is the PI-2730 series of low-stress G-line photodefinable polyamides available from HD Microsystems. For feature sizes below about three micrometers, a more preferred material for the film 44 is believed to be a higher density low-stress I-line polyimide such as HD-8000, also available from HD Microsystems. In addition to layers 18 and/or 20 intentionally responsive to temperature, humidity, etc., the beam 10 can be formed to contain one or more additional layers of a variety of different materials, both metallic and nonmetallic, such as adhesion-promoting, stress-distributing layers, and electrical contact layers, as well as patterned layers for the purpose of modifying the response of the beam 10 to temperature, humidity, or another environmental condition.

The beam 10 is configured to have a well-defined contact area with its fixed contact pad 14 as a result of the moving contact 12 carried by the beam 10 being defined by an upper layer 18 of the layered structure 16 that protrudes through an opening 22 in a lower layer 20 of the structure 16 toward the fixed contact pad 14. (The terms "upper" and "lower" are in reference to the orientation shown in FIG. 1, and are not limitations to the beam 10 or its use.) As a result, the surface area of the moving contact 12 can be precisely defined by the size and shape of the opening 22, as well as the gap 24 between the moving contact 12 and the fixed contact pad 14.

As represented in FIGS. 3a through 3h, a preferred process for fabricating the bimorph beam 10 of FIGS. 1 and 2 makes use of a substrate 30, which can be formed of a variety of materials, a particularly suitable example being a silicon wafer, though sputtered silicon, silicon oxide, aluminum, and other materials are also foreseeable. In FIG. 1, the bimorph beam 10 is represented as having been fabricated on a CMOS wafer 30 that includes CMOS circuitry 28, in which case the beam fabrication process preferably uses low temperature processes that are compatible with CMOS wafer processing. While the process depicted in FIGS. 3a through 3h will be described in terms of fabricating a single beam 10, it should be appreciated than any number of beams 10 could be simultaneously fabricated using the disclosed process steps.

Figure 3A:
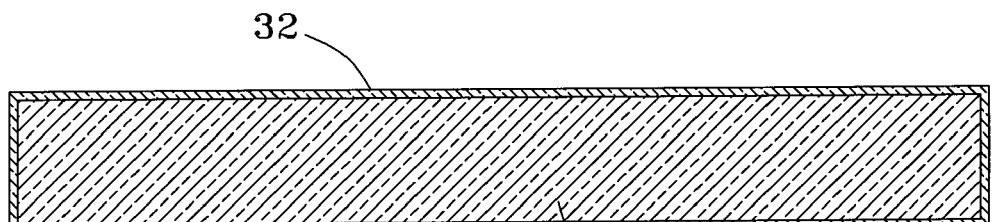
FIGS. 3a through 3h are side views depicting steps of a preferred process for fabricating the bimorph beam of FIGS. 1 and 2.
Figure 3B:
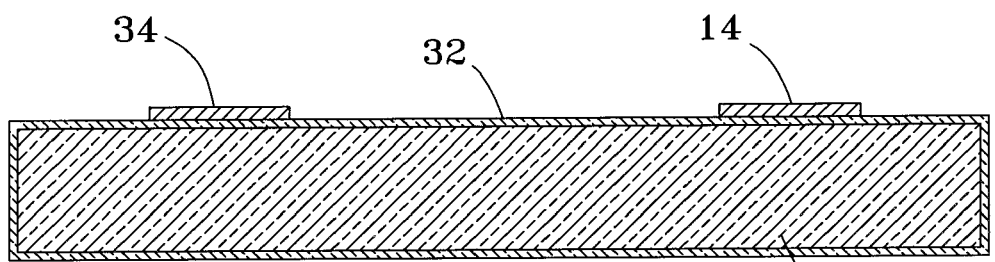

FIG. 3a shows the substrate 30 as having been coated with an insulating layer 32, such as silicon dioxide. The purpose of the insulating layer 32 is to enable different electrical electrodes on the substrate surface to be at different potentials. In FIG. 3b, a layer of an electrically conductive material (for example, a metal such as aluminum) has been deposited over the insulating layer 32 and then patterned to form the fixed contact pad 14, as well as an anchor pad 34 with which the beam 10 will be anchored to the substrate 30. The conductive layer for the pads 14 and pad 34 can be deposited using any suitable thin-film deposition process, such as electron beam (E-beam) evaporation, E-beam sputtering, and other physical vapor deposition (PVD) techniques. A suitable thickness for the conductive layer (and therefore the contact pad 12 and anchor pad 34) is about 0.5 to about 1 micrometer, though lesser and greater thicknesses are foreseeable.

Figure 3C:
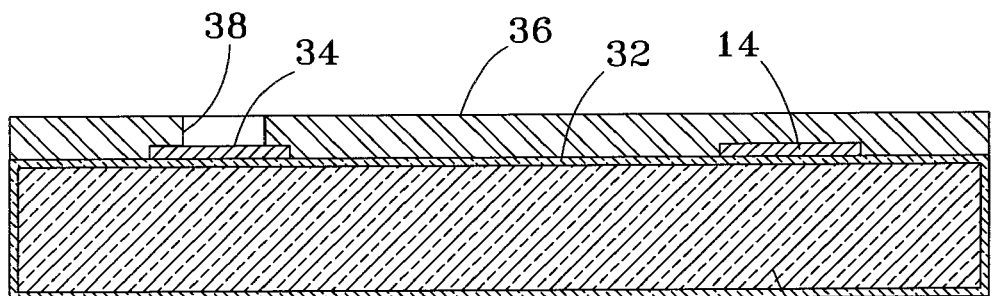

FIG. 3c shows the substrate 30 following the deposition and patterning of a sacrificial spacer layer 36 over the contact and anchor pads 14 and 34. The spacer layer 36 can be composed of different thin-film materials and deposited using a variety of thin-film methods. In an exemplary process flow, the spacer layer 36 is silicon and deposited using an E-beam sputtering method. Other methods of depositing the spacer layer 36 include plasma-enhanced chemical vapor deposition (PECVD), plasma-assisted chemical vapor deposition (PACVD), laser-assisted chemical vapor deposition (LACVD), E-beam evaporation, and spin coating. Other low temperature deposition methods and materials can also be used to form the spacer layer 36. A suitable thickness for the spacer layer 36 is about 0.5 to about 4 micrometers, though lesser and greater thicknesses are foreseeable. As evident from comparing FIG. 1 and FIG. 3c, the spacer layer 36 is patterned and etched to define an opening 38 that exposes an area of the anchor pad 34 to which the beam 10 will be anchored to the substrate 30. The etching process can be a wet etch, dry etch, or a combination thereof.

Figure 3D:
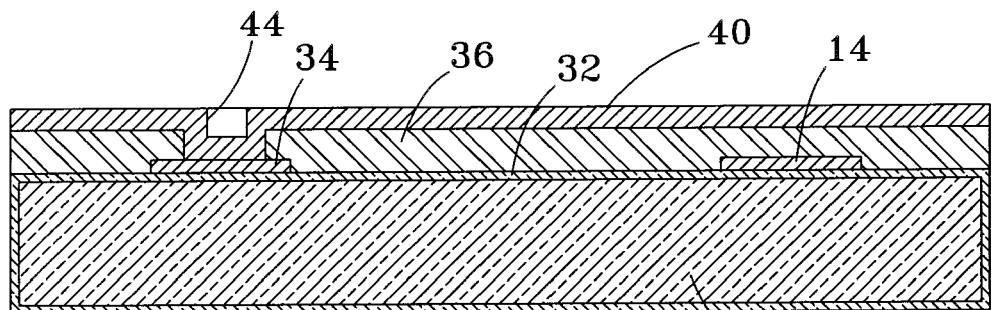

FIG. 3d shows the substrate 30 after the deposition of a layer that will form the lower layer 20 of the beam layered structure 16. For convenience, this layer is designated as the M1 layer 40. As evident from FIG. 3d, the M1 layer 40 is also conformally deposited within the opening 38 that exposes the anchor pad 34, so that a portion 44 of the M1 layer 40 forms part of the anchor 26 with which the beam 10 will be anchored to the substrate 30 (FIG. 1). The selection of material for the M1 layer 40 is determined in conjunction with a second layer shown in FIG. 3g, which is patterned in FIG. 3h to define the upper layer 18 of the beam layered structure 16. This second layer is designated as the M2 layer 42 and preferably formed of a conductive material that, in combination with the M1 layer 40, provides the desired difference in CTE (or other physical property) for the environmental condition (e.g., temperature) to be monitored. According to a preferred aspect of the invention, the M1 layer 40 is not required to be electrically conductive, as would be the case with conventional bimorph beams, but instead can be formed of a conductive or nonconductive material. In the process flow of FIGS. 3a through 3h, the M1 layer 40 is preferably PECVD oxide. Alternatively, the M1 layer 40 could be formed of other materials, including conductive metals such as gold, nickel, copper, as well as nonconductive materials such as PECVD silicon nitride and silicon oxynitride. If the spacer layer 36 is chosen to be other than silicon, amorphous silicon, sputtered silicon, or PECVD silicon can be used for the M1 layer 40.

Figure 3E:
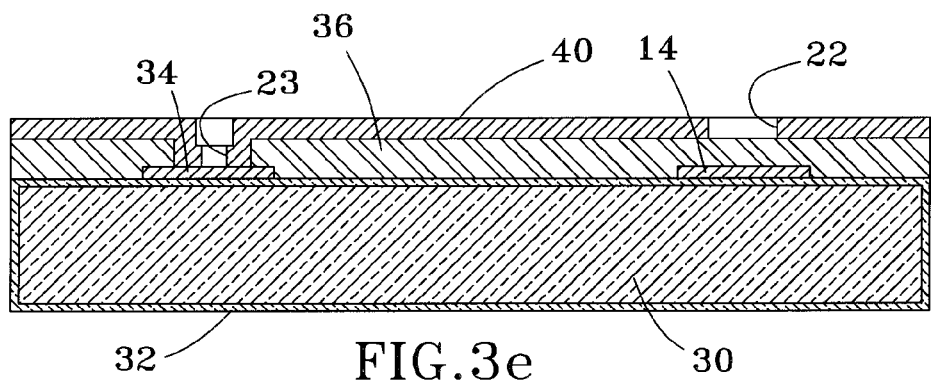

In FIG. 3e, the M1 layer 40 has been patterned and etched to form the opening 22 (FIG. 1) used to define the moving contact 12 of the beam 10. The shape of the opening 22 can be square, rectangular, round, or any other appropriate shape capable of suitably controlling the contact area with the fixed contact pad 14. The opening 22 is formed by using a suitable etching process to remove a small area of the M1 layer 40 down to the spacer layer 36. In the example where the M1 layer 40 is PECVD oxide, this etch can be performed using a fluorine chemistry. The etch process can be wet using such chemicals as buffered hydrofluoric acid, or dry using a reactive ion etching (RIE) technique. The slope of the etched area can be controlled using the appropriate etch process. As seen in FIG. 3e, a second opening 23 is preferably patterned and etched in the M1 layer 40 at the same time as the opening 22. As discussed below, if the lower layer 20 (formed by the M1 layer 40) of the beam 10 is nonconductive, the opening 23 can be employed to electrically couple the upper layer 18 (formed by the M2 layer 42) of the beam 10 through the anchor pad 34 to the substrate 30 or to any part thereof, such as an electrical interconnect layer of the substrate 30, as would be the case if the substrate 30 is a CMOS (or other integrated circuit) wafer.

Figure 3F:
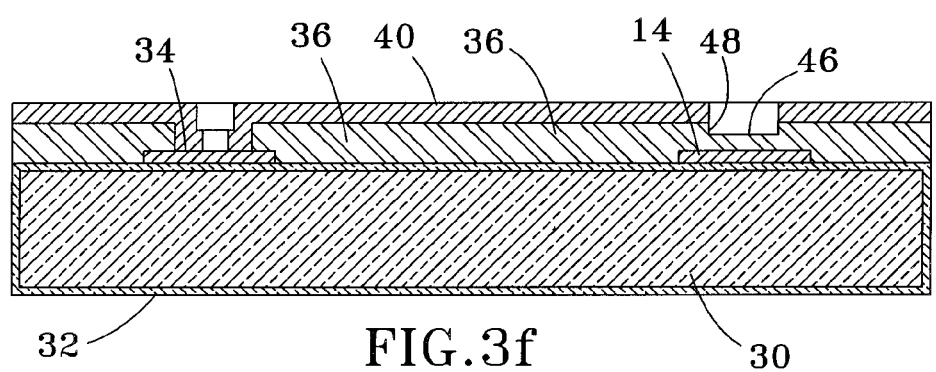

FIG. 3f shows a recess 48 as having been defined as a result of removing a portion of the spacer layer 36 below the opening 22 in the M1 layer 40, using the opening 22 in the M1 layer 40 as a mask pattern. The etching process can be a wet etch or a dry etch using an RIE. In the example in which the spacer layer 36 is formed of sputtered silicon, the preferred etch technique is RIE. The thickness of the remaining portion 46 of the spacer layer 36 will subsequently define the gap 24 between the moving contact 12 of the bimorph beam 10 and its fixed contact pad 14 on the substrate 30. The removal of a portion of the spacer layer 36 to leave the remaining portion 46 whose thickness can be accurately controlled by the etch process is intended to ensure that the well-defined area of the moving contact 12 will come into contact with the fixed contact pad 14 when the beam 10 deflects over a well-controlled distance (the width of the gap 24). In other words, by precisely controlling the thickness of the remaining portion 46 of the spacer layer 36, the width of the gap 24 is precisely controlled.

Figure 3G:
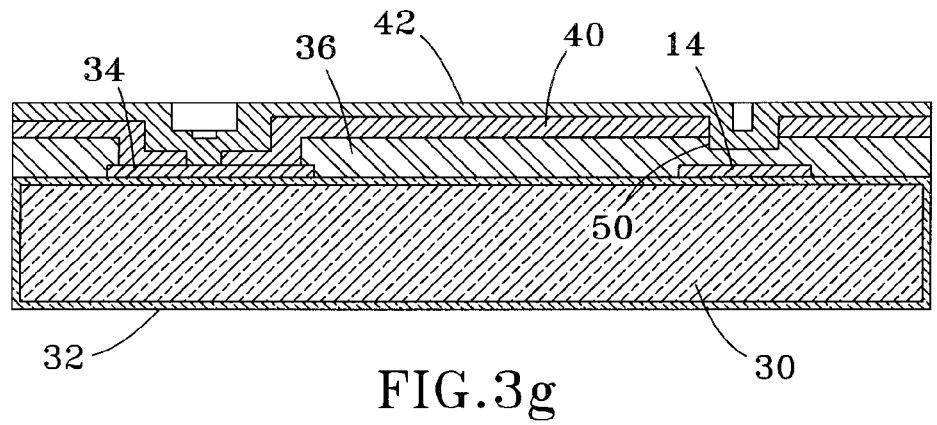

FIG. 3g shows the substrate 30 after the aforementioned M2 layer 42 has been deposited. As previously noted, the M2 layer 42 is conductive and preferably formed of metal deposited by a PVD process, for example, an E-beam sputtered aluminum. Other commonly used metals deposited by thin-film processes could also be used. As evident from FIG. 3g, the M2 layer 42 is deposited over the M1 layer 40, including conformally on the portion 44 of the M1 layer 40 within the opening 38 in the spacer layer 36, as well as conformally within the openings 22 and 23 in the M1 layer 40 and conformally within the recess 48 in the spacer layer 36. The portion 50 of the M2 layer 42 within the opening 22 and recess 48 protrudes below the M1 layer 40 and forms the moving contact 12, as well as determines its well-defined contact area and shape, while the distance between the moving contact 12 and the fixed contact pad 14 is determined by the thickness of the remaining portion 46 of the spacer layer 36 as discussed previously. The portion of the M2 layer 42 within the second opening 23 in the M1 layer 40 electrically couples the upper layer 18 of the beam 10 to the substrate 30 or a portion thereof, such as an electrical interconnect layer deposited on or prefabricated in the substrate 30, as also previously discussed. Alternatively, electrical connection can be made to the upper layer 18 by various other means commonly used in semiconductor and MEMS devices, including wire-bonding and metallized vias. It should be noted that the opening 23, wire-bonding, metallized vias, and other such features are unnecessary if the lower layer 20 of the beam is formed of an electrically conductive material.

Figure 3H:
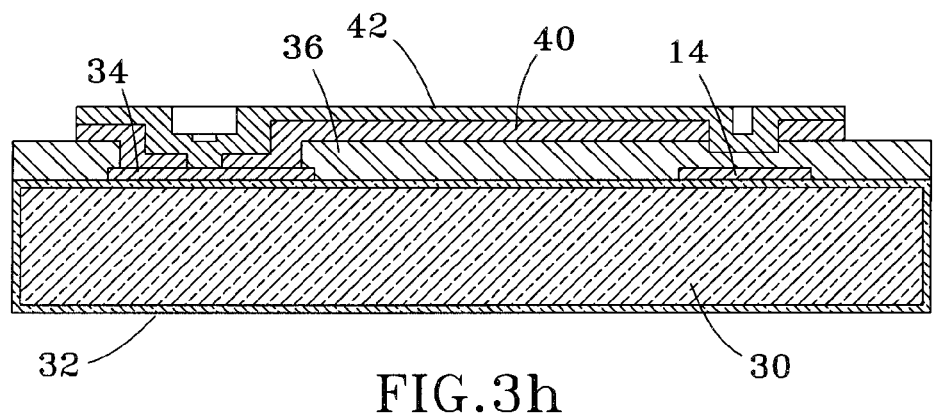

FIG. 3h shows the result of defining the length and width of the beam 10 by patterning and etching the M1 and M2 layers 40 and 42. The etch process can be a dry etch, wet etch or a combination of the two, depending in part on the materials chosen for the M1 and M2 layers 40 and 42. The M2 layer 42 is first etched using a photoresist mask (not shown), after which the M1 layer 40 can be etched using the M2 layer 42 as a mask. In the example in which the M2 layer 42 is aluminum and the M1 layer 40 is PECVD oxide, both layers 40 and 42 can be etched using RIE.

FIG. 1 depicts the result of removing the spacer layer 36 to free the beam 10 except for the anchor 26 defined by the anchor pad 34 and the portions of the M1 and M2 layers 40 and 42 deposited within the opening 38 patterned and etched in the spacer layer 36. The spacer layer 36 can be removed with an etchant that is selective to the M1 and M2 layers 40 and 42 as well as the layer used for the fixed contact pad 14. The process of removing the spacer layer 36 is a release etch since by removing the spacer layer 36, the bimorph beam 10 is suspended (cantilevered in the example shown) and free to respond to changes in environmental conditions (e.g., temperature) and, depending on the length of the beam 10 and the width of the gap 24, contact the fixed contact pad 14. Because the contact area of the moving contact 12 is controllably defined by that portion 50 of the M2 layer 42 protruding below the lower layer 20 of the beam 10 formed by the M1 layer 40, the beam's contact area and distance to the fixed contact pad 14 is well defined.

Figure 4:
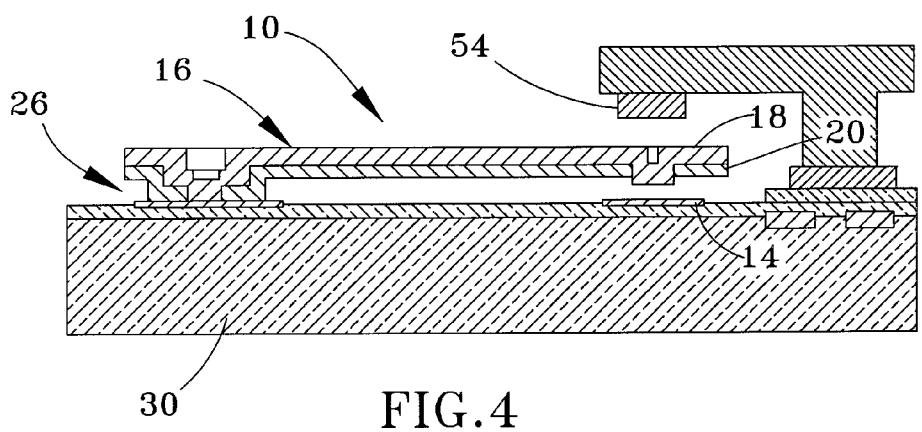
FIG. 4 represents a bimorph beam of a type that can be fabricated in accordance with FIGS. 3a through 3h, and showing the addition of a top fixed contact for the structure.

FIG. 4 shows the formation of a bimorph beam 10 essentially as represented in FIG. 1, but with a second fixed contact pad 54 above the end of the beam 10. In this case, if the bimorph beam 10 deflects sufficiently downward (in reference to the orientation shown), the contact 12 on the beam 10 will contact the fixed contact pad 14 in response to an increase or decrease in temperature, humidity, etc., depending on the difference in CTE, humidity-induced expansion characteristics, etc., of the materials used to form the beam 10. Likewise, the upper layer 18 of the beam 10 will contact the fixed contact pad 54 if the beam 10 deflects sufficiently upward (again, in reference to the orientation shown) in response to a change in temperature, humidity, etc., opposite that which resulted in contact with the fixed contact pad 14.

From the foregoing, it should be appreciated that the bimorph beam 10 is capable of having a well-defined area of contact with the fixed contact pad 14 in part as a result of the contact being made not with the layer 20 of the beam 10 closest to the contact pad 14, but a different layer 18 that projects through the layer 20 toward the pad 14. As a consequence, the layer 20 of the beam 10 closest to the contact pad 14 can be formed of a nonconductive material and serve as an electrically insulating layer to the beam 10. The processing steps can be employed to simultaneous fabricate arrays of beams 10 for use in a wide variety of applications, an example being the monitoring of temperature, humidity, etc., including cumulative sensing in which the beams 10 operate as switches and different beams 10 contact their respective fixed contact pads 14 at different levels of heat, humidity, etc. With such a capability, an array of beams 10 can be used to continuously monitor storage and shipping conditions for various items in a variety of applications, including supply-chain management of perishable goods, pharmaceuticals, chemicals, and fresh agriculture products. The fabrication of the bimorph beam 10 of this invention is also compatible with low temperature fabrication process suitable for integration with CMOS process to form an integrated temperature sensor array.

While the invention has been described in terms of specific embodiment, it is apparent that other forms could be adopted by one skilled in the art. For example, the physical configuration of the beam 10 could differ from that shown, and materials, processes, and process sequences other than those noted could be use. Therefore, the scope of the invention is to be limited only by the following claims.

The invention claimed is:

1. A method of forming a sensor structure, the method comprising:
    depositing an electrically conductive material and forming therefrom a first contact [14] on a substrate [30]; and
    forming a bimorph beam [10] anchored to the substrate [30] so as to have a portion thereof suspended above the first contact [14], the bimorph beam [10] being formed to have a multilayer structure comprising first and second layers [42,40], the second layer [40] being formed prior to the first layer [42] so as to be located between the first layer [42] and the substrate [30] and formed to have an opening [22] therethrough, the first layer [42] being formed by depositing an electrically conductive material on the second layer [40] so that a portion [50] of the first layer [42] is simultaneously deposited within the opening [22] in the second layer [40] and projects completely through the opening [22] to define a second contact [12] at a surface of the bimorph beam [10] facing the first contact [14], the second contact [12] being located on the bimorph beam [10] so as to be spaced apart and aligned with the first contact [14] for contact with the first contact [14] when the bimorph beam [10] sufficiently deflects toward the substrate [30]; and wherein the step of forming the bimorph beam [10] comprises: depositing a spacer layer [36] on the substrate [30]; depositing the second layer [40] of the bimorph beam [10] on the spacer layer [36] so that a portion [44] of the second layer [40] projects through the spacer layer [36]; forming the opening [22] in the second layer [40]; depositing the first layer [42] of the bimorph beam [10] on the second layer [40] and in the opening [22] thereof to form the portion [50] of the first layer [42] within the opening [22] of the second layer [40] and form the second contact [12] at the surface of the bimorph beam [10] facing the first contact [14]; and removing the spacer layer [36] so that the multilayer structure comprising the first and second layers [42,40] is suspended above the first contact [14] by an anchor [26] comprising the portion [44] of the second layer [40] that projects through the spacer layer [36].

2. The method according to claim 1, further comprising the step of etching a recess [48] into the spacer layer [36] in a region of the spacer layer [36] exposed by the opening [22] in the second layer [40], wherein depositing the first layer [42] in the opening [22] further comprises depositing the first layer [42] in the recess [48] in the spacer layer [36] such that the portion [50] of the first layer [42] is disposed within the opening [22] in the second layer [40] and within the recess [48] in the spacer layer [36], and wherein removing the spacer layer [36] causes the second contact [12] defined by the portion [50] of the first layer [42] within the recess [48] to be closer to the first contact [14] than the first layer [42].

3. The method according to claim 2, wherein a portion [46] of the spacer layer [36] remaining between the recess [48] and the substrate [30] establishes a gap between the first and second contacts [14,12] following removal of the spacer layer [36].

4. The method according to claim 1, wherein the second layer [40] is formed of an electrically nonconductive material.

5. The method according to claim 1, wherein a plurality of bimorph beams [10] are simultaneously formed on the substrate [30] in accordance with the steps of claim 1.

6. The method according to claim 1, wherein the bimorph beam [10] deflects in response to changes in an environmental condition selected from the group consisting of temperature and humidity.

7. The method according to claim 1, further comprising the step of fabricating an integrated circuit [28] on the substrate [30].

8. The method according to claim 1, further comprising the step of forming a third contact [54] disposed opposite the first contact [14] such that the bimorph beam [10] is between the first and third contacts [14,54], the third contact [54] being formed of an electrically conductive material and located relative to the bimorph beam [10] so as to contact the first layer [42] when the bimorph beam [10] sufficiently deflects away from the substrate [30].

9. The method according to claim 1, wherein the multilayer structure of the bimorph beam [10] consists of the first and second layers [42,40].

10. The method according to claim 1, further comprising forming a second opening [23] through the portion [44] of the second layer [40] that projects through the spacer layer [36], and wherein depositing the first layer [42] of the bimorph beam [10] on the second layer [40] further comprises simultaneously depositing the first layer [42] within the second opening [23] in the portion [44] of the second layer [40] to form an electrical connection through the second layer [40] and within the anchor [26], the electrical connection electrically coupling the second contact [12] to a conductor pad [34] between the second layer [40] and the substrate [30].

11. The method according to claim 1, further comprising the step of using the bimorph beam [10] to sense changes in an environmental condition as a result of the first and second layers [42,40] causing the bimorph beam [10] to deflect and cause contact between the first and second contacts [14,12] in response to a change in the environmental condition.

12. The method according to claim 11, wherein the environmental condition is temperature.

13. The method according to claim 11, wherein the environmental condition is humidity.

14. The method according to claim 11, wherein the bimorph beam [10] are used to continuously monitor storage and shipping conditions of an item chosen from the group consisting of perishable goods, pharmaceuticals, chemicals, and fresh agriculture products.

15. The method according to claim 5, further comprising performing cumulative sensing with the plurality of bimorph beams [10] by operating the bimorph beams [10] as switches and forming the plurality of bimorph beams [10] to deflect in response to changes in an environmental condition so that the second contacts [12] thereof contact their respective first contacts [14] at different levels of the environmental condition.

16. The method according to claim 15, wherein the bimorph beams [10] are used to continuously monitor storage and shipping conditions of an item chosen from the group consisting of perishable goods, pharmaceuticals, chemicals, and fresh agriculture products.

17. A method of forming a sensor structure, the method comprising:
    depositing an electrically conductive material on a substrate [30] and forming therefrom an anchor pad [34] and a first contact [14] on the substrate [30];
    depositing a spacer layer [36] on the substrate [30] and over the anchor pad [34] and the first contact [14];
    forming an opening [38] in the spacer layer [36] so as to expose at least a portion of the anchor pad [34];
    depositing an electrically nonconductive layer [40] on the spacer layer [36] so that a portion [44] of the nonconductive layer [40] is deposited in the opening [38] of the spacer layer [36] and contacts the anchor pad [34];
    forming a first opening [22] completely through the nonconductive layer [40] and separated from the first contact [14] on the substrate [30] by a first portion [46] of the spacer layer [36];
    forming a second opening [23] completely through the nonconductive layer [40] that exposes at least part of the portion of the anchor pad [34] exposed by the opening [38] in the spacer layer [36];
    depositing an electrically conductive layer [42] on the nonconductive layer [40] and in the first and second openings [22,23] thereof to simultaneously form a second contact [12] defined by a portion [50] of the conductive layer [42] deposited within and projecting completely through the first opening [22] in the nonconductive layer [40] and to simultaneously form an electrical connection to the anchor pad [34] with a portion of the conductive layer [42] deposited within and projecting completely through the second opening [23] in the nonconductive layer [40]; and
    removing the spacer layer [36] so that a multilayer structure comprising the conductive and nonconductive layers [40,42] is suspended above the first contact [14] by an anchor [26] comprising the portion [44] of the nonconductive layer [40] deposited within the opening [38] in the spacer layer [36] and the portion of the conductive layer [42] deposited within the opening [23] in the nonconductive layer [40].

18. The method according to claim 17, further comprising the step of etching a recess [48] into the spacer layer [36] in a region of the spacer layer [36] exposed by the first opening [22] in the nonconductive layer [40], wherein depositing the conductive layer [42] in the first opening [22] further comprises depositing the conductive layer [42] in the recess [48] in the spacer layer [36] such that the portion [50] of the conductive layer [42] is disposed within the first opening [22] in the nonconductive layer [40] and within the recess [48] in the spacer layer [36], and wherein removing the spacer layer [36] causes the second contact [12] defined by the portion [50] of the conductive layer [42] within the recess [48] to be closer to the first contact [14] than the nonconductive layer [40].

19. The method according to claim 17, wherein a plurality of bimorph beams [10] are simultaneously formed on the substrate [30] in accordance with the steps of claim 17, and the method further comprises:
    forming the plurality of bimorph beams [10] to operate as switches and deflect in response to changes in an environmental condition so that the second contacts [12] thereof contact their respective first contacts [14] at different levels of the environmental condition; and
    continuously monitoring storage and shipping conditions of items by performing cumulative sensing with the plurality of bimorph beams [10].

* * * * *